SEQUENTIAL LOAD ENERGIZING CIRCUIT
Filed Dec. 28, 1966
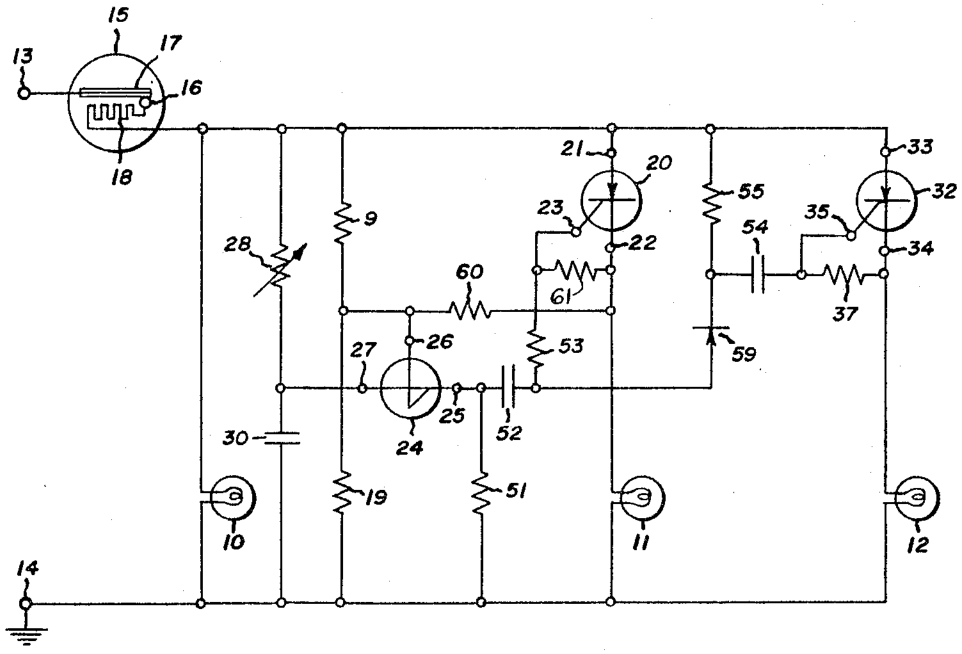
INVENTOR:
ABDULAHAT ADEM,
BY Urban H. Faubion
HIS ATTORNEY.

3,463,936
SEQUENTIAL LOAD ENERGIZING CIRCUIT
Abdulahat Adem, Auburn, N.Y., assignor to General Electric Company, a corporation of New York
Filed Dec. 28, 1966, Ser. No. 605,459
Int. Cl. H03k 5/20
U.S. Cl. 307—223 1 Claim

ABSTRACT OF THE DISCLOSURE

A circuit is provided for energizing two or more loads (e.g., lamps) sequentially and de-energizing all of the loads once all have been energized in order to start the sequential cycle over again which incorporates a series of parallel connected load normally open circuits which are connected across a supply terminal and a normally closed switch in the supply circuit which is opened in response to load current flowing through all of the parallel connected load circuits. A solid state switching means is provided which fires the first of the load current carrying solid state switches a predetermined time after energization at the circuit terminals and each subsequent load (lamp) of the parallel connected load circuits in sequence of predetermined time after the preceding load circuit is rendered conductive thereby sequentially to render each of the load circuits conductive. The firing arrangement for each of the solid state switches incorporates solid state switches which are rendered conductive in response to the output of a voltage comparator circuit to render firing essentially independent of voltage level variations. Once all of the load circuits are conductive, they are all de-energized by the opening of the normally closed switch which closes again a predetermined time after opening in order to restart the firing cycle.

This invention relates to circuits of the type frequently referred to in the art as flashers or chaser circuits wherein a series of load devices (such as lamps) are energized in sequence with each load which is energized remaining energized until all loads are energized after which all loads are simultaneously de-energized and the cycle starts over again. Such circuits are useful in many applications including barricade flashers, rotating beacons, portable advertising signs and sequential turn signal systems for vehicles, etc.

The system specifically illustrated and described herein is a sequential turn signal for an automobile or other vehicle, however, it will be appreciated that other applications are within the contemplation of the present invention.

In general, known prior art circuits which perform the same general functions as those performed by the circuits of the present invention utilize mechanical switching arrangements which are subject to mechanical failures. Where solid state switches have been used in the past to avoid mechanical failures, highly elaborate circuits utilizing components which are relatively expensive have been used.

Accordingly, the present invention is directed to providing a solid state flasher circuit wherein highly reliable circuits and solid state circuit elements are used and a minimum number of circuit components are required.

Prior flasher circuits, while overcoming difficulties with mechanical switching arrangements and providing higher reliability, have other difficulties. For example, in copending Grafham application, Ser. No. 605,415, filed Dec. 28, 1966, a solid state flasher or chaser circuit is disclosed wherein the silicon unilateral switch provides sequential firing of semiconductor controlled rectifiers which in turn each supply a load. However, the sequential firing is dependent upon operation of the silicon unilateral switches which in that context are fired in their anode to cathode voltage firing mode and consequently require from 6 to 8 volts to trigger them. Since many of the primary uses of such chaser circuits utilize batteries for operation, the voltage level at which the circuit is required to operate is uncertain. Therefore, some degree of uncertainty is involved where sequential operation is dependent upon voltage level.

In my copending application Ser. No. 605,414 filed even date herewith and assigned to the same assignee, a circuit is provided for rendering initiation of sequencing in a chaser or flasher circuit essentially independent of supply voltage variations. This invention represents an improvement over both the above mentioned inventions and has for its object to provide the advantages of those inventions at a lower cost. Lower cost is accomplished by the utilization of fewer and less expensive components.

In carrying out the present invention, a gate fired semiconductor switch is utilized to initiate sequencing of load energizing semiconductor switches and the gate fired switch has its anode to gate firing voltage supplied by a voltage comparator circuit in order to render the sequencing a function of voltage difference rather than a function of absolute voltage level in the circuit.

The novel features which are believed to be characteristic of the invention are set forth with particularity in the appended claim. The invention itself, however, both as to its organization and method of operation together with further objects and advantages thereof may best be understood by reference to the following description taken in connection with the accompanying drawing in which:

The drawing shows a schematic diagram of a circuit for sequentially energizing load circuits wherein each of the load circuits employs a solid state gate fired semiconductor switch and each of the switches is sequentially fired in response to signals from the output of a single silicon unilateral switch.

Referring to the drawing, a schematic diagram of a flasher circuit of one embodiment of the invention is disclosed as it is used for turn signals of an automobile. In order to simplify the drawing and description, only the right rear turn signal lights 10, 11 and 12 are illustrated. The turn switches are not shown nor are the front signal light systems shown. It will be recognized that the system illustrated can be duplicated for the left side of the automobile, and front turn lights can be used either as single lights or the flasher system illustrated for the right rear turn signal may be duplicated in the front of the automobile. In order to indicate a right turn the inboard lamp 10 is first energized, then center lamp 11 is energized and next lamp 12 is energized. Once all three lamps are energized, a means is provided to de-energize all three and start the sequence again. Thus, a flashing arrow is simulated.

Power for the circuit illustrated is applied between input terminals 13 and 14 which represent the positive DC power supply and ground terminal 14 respectively. The means for resetting the system, that is, for disconnecting all of the lamps from the power source once all three lamps are energized comprises, in the embodiment illustrated, a conventional thermal flasher switch 15 which is normally closed. Flasher switch 15 has a contact 16 which is normally contacted by a conductive bimetal element 17 to complete the circuit. In order to provide for opening switch 15 a heater element 18 is positioned adjacent bimetal 17 and connected in series circuit relation with switch contact 16. Heating element 18 normally only generates enough heat to cause the bimetal element 17 to deform and open the circuit after a period of time which is sufficient for all three of the sequentially energized signal lamps 10, 11 and 12 to become energized. After a period with all three lamps 10, 11 and 12 on, the thermal flasher opens, power is removed from the circuit and the lamps are extinguished. With the thermal flasher switch 15 open, heater 18 is no longer energized and the bimetal element 17 again closes on contact 16 again to apply power to the circuit and repeat the sequence.

It will be noted that the first lamp circuit (load circuit) only contains inboard lamp 10 connected directly across the input terminals 13 and 14 in series with the thermal flasher switch 15. Thus, inboard lamp 10 is energized whenever power is applied to input terminals 13 and 14 and thermal flasher switch 15 is closed.

In order to provide a means for center lamp 11 to be in a de-energized condition while inboard lamp 10 is energized a solid state switch 20 is provided in series with the center lamp and this center lamp circuit is connected in parallel with inboard lamp 10 across power input terminals 13 and 14. As illustrated, the solid state switch 20 in series with lamp 11 is of the type known in the art as a semiconductor controlled rectifier (SCR) which has an anode terminal 21, cathode terminal 22 and a gate terminal 23. Details of the operation of the SCR are not described here since its operation is well known in the art, and it is described in many publications. It should suffice to say that the SCR is normally in a high impedance state (essentially non-conducting) and can be fired or rendered conductive by application of the proper signal at the gate terminal 23.

As illustrated, in order to fire SCR 20 and energize the series circuit of center lamp 11, a silicon unilateral switch 24 is utilized. The silicon unilateral switch 24 is provided with cathode, gate and anode terminals 25, 26 and 27 respectively. Since the silicon unilateral switch is described in detail in the literature (see the article entitled "Using the Silicon Bilateral/Unilateral Switch" by Robert Muth which appears in the March 1966 issue of E.E.E. magazine, pages 78 through 85), it is not described in detail here. However, functionally the unilateral switch appears as an open circuit until fired in one of two ways, then it becomes highly conductive. One way to render the silicon unilateral switch conductive is to provide a voltage of between 6 and 8 volts between anode and cathode terminals 27 and 25 respectively (positive voltage at the anode). This firing mode is not used here. The gate firing mode entails rendering both gate and anode terminals 26 and 27 positive relative to cathode terminal 25 and anode terminal more positive than gate terminal by about 0.4 volt. In order to provide a voltage comparator firing arrangement for silicon unilateral switch 24 which renders its firing level (and the sequential firing operation) essentially independent of supply voltage level a series circuit comprising a resistor 28 and capacitor 30 and a voltage divider comprising series connected resistors 9 and 19 are connected in parallel with each other and across supply terminals 13 and 14.

Silicon unilateral switch 24 has its anode terminal 27 connected at the junction between resistor 28 and capacitor 30 and its gate terminal 26 connected to the voltage divider circuit between resistors 9 and 19. Thus, the voltage between anode and gate terminals 27 and 26 is the output of the voltage comparator arrangement. Thus, in this instance when capacitor 30 charges up through resistor 28 to a value which is more than about 0.4 volt higher than the voltage between resistors 9 and 19, switch 24 becomes conductive. Notice here that the firing voltage is not dependent upon the magnitude of line voltage but only upon the difference voltage of the comparator circuit.

Cathode terminal 25 of silicon unilateral switch 24 is connected to the ground terminal 14 through a resistor 51. Thus, once the inboard lamp 10 is energized and silicon unilateral switch 24 is rendered conductive, a voltage pulse is produced across resistor 51 to ground. Notice a capacitor 52 and resistor 53 are connected directly from the juncture between resistor 51 and cathode terminal 25 of silicon unilateral switch 24. Thus, after a predetermined period of time the output pulse which appears across resistor 51 is coupled through capacitor 52 and resistor 53 to gate electrode 23 of SCR 20 to trigger SCR 20 into conduction thereby energizing center rear signal lamp 11. Thus, rear inboard lamp 10 and rear center lamp 11 are energized.

Firing of SCR 32 in the circuit of outboard lamp 12 is directly dependent upon an output pulse from silicon unilateral switch 24 but is not fired by the first pulse due to the fact that the first pulse is blocked by a voltage blocking circuit. Note that the voltage which appears across resistor 51 in the circuit of silicon unilateral switch 24 is also coupled through capacitor 52 directly to a diode rectifier 59 which is of a polarity to conduct in the direction of the circuit being traced, and a capacitor 54 directly to gate terminal 35 of the outboard lamp firing SCR 32. It is possible that this circuit would fire SCR 32 except that the juncture between diode 59, resistor 53 and capacitor 54 is connected directly to the positive terminal 13 through a resistor 55. Resistor 55 is selected so that the charging current which establishes the blocking charge on capacitor 54 is insufficient to trigger SCR 32 into conduction. Thus, the reason the SCR 32 which ultimately controls energization of output lamp 12 does not fire upon firing of the circuit of the silicon unilateral switch 24 is that resistor 55 and capacitor 54 form the voltage blocking circuit (referred to above) which back biases diode rectifier 59.

With SCR 20 conductive and the center rear lamp 11 energized, the gate electrode 23 and cathode electrode 22 of SCR 20 rise to substantially the supply voltage less the conduction drop of SCR 20 and capacitor 52 charges to this potential through resistors 51, 53 and 61. When the circuit of silicon unilateral switch 24 produces a second pulse (fires for the second time) the rectifier 59 is no longer back biased (because of the voltage rise of capacitor 52), and the output pulse passes through diode rectifier 59 to fire SCR 32. Outboard signal lamp 12 is then energized. Again, after a period with all three lamps energized, thermal flasher 15 opens, power is removed from the circuit and the lamps are extinguished. The sequence repeats when the thermal flasher recycles.

Actually after the first pulse of the sequence from silicon unilateral switch 24 and after the center lamp circuit (lamp 11 and SCR 20) are conductive the impedance of the circuit elements are such that the time required to charge capacitor 30 back up to firing potential would be different (less) for the second pulse and the time interval between energization of the outboard lamp 12 and center lamp 11 would be less than the time interval between energizing inboard lamp 10 and center lamp 11. In order to equalize these time intervals a resistor 60 is connected between cathode electrode 22 of SCR 20 and the junction between resistors 9 and 19 on the voltage divider. Thus, resistor 60 constitutes an impedance in parallel with resistor 19 when SCR 20 is conductive and equalizes the time required to produce the first pulse and subsequent pulses. Thus, it is seen that the objects have been carried out by providing a circuit for repetitively sequentially energizing a number of load devices wheren the sequencing operation is independent of supply voltage level.

What I claim as new and desire to secure by Letters Patent of the United States is:

1. A circuit for repetitively energizing more than one load device sequentially and de-energizing the load devices after all are energized including in combination, a pair of supply terminals for connection to a supply source, at least two load circuits each connected between said input terminals and in parallel with each other for energization by a voltage supplied across said terminals, a normally conductive load current responsive switch means connected in series with all of said parallel connected load circuits, said load current responsive switch means responsive to energy supplied to said load circuits to open when all said load circuits are energized at one time thereby to disconnect said load circuits from said source and to close again a predetermined time after load current ceases to flow in said load circuits thereby to reset said system, first and second normally non-conducting solid state switch means each having anode, cathode and gate electrodes and each having its anode and cathode connected in series circuit relation in said first and second load circuits respectively whereby each of said load circuits are normally nonconductive and are effectively rendered conductive by rendering the respective solid state switch means conductive, third solid state switch means including a single normally non-conductive unilateral switch and a voltage blocking circuit, said unilateral switch connected to be rendered conductive a predetermined time after application of voltage across said first and second load circuits and connected to deliver a voltage to said first solid state switch means and said blocking voltage blocking circuit thereby to render said first solid state switch means and said first load circuit conductive, said voltage blocking circuit connected to deliver an output to said second solid state switch means after an input voltage is supplied of sufficient magnitude to overcome its voltage blocking level, means effectively to raise the voltage level of the output from said unilateral switch upon conduction of said first solid state switch means thereby to render said second solid state switch means and said second load circuit conductive after conduction of said first load circuit, said single non-conductive unilateral switch having anode, cathode and gate terminals, a first resistor and first capacitor connected in series circuit relation with each other and in parallel with said first load circuit, the anode of said unilateral switch connected to said series connected resistance capacitor circuit at the juncture between said resistor and said capacitor, a voltage divider circuit the gate terminal of said unilateral switch connected to a point on the voltage divider circuit and a second resistor connected between gate terminal of said single unilateral switch and the cathode of said first solid state switch means, a third resistor connected between the cathode terminal of said unilateral switch and the negative supply terminal, the cathode terminal of said unilateral switch also connected in a series circuit with the gate electrode of said first solid state switch means which series circuit includes respectively a second capacitor and a fourth resistor, a pair of biasing resistors each connected directly between the cathode and gate electrodes of one said first and second solid state switch means, the juncture between said second capacitor and said fourth resistor connected to a gate electrode of said second solid state switch means by a circuit path defined by a blocking rectifier having the same polarity as unilateral switch and a third capacitor, a fifth resistor connected from the anode electrode of said second solid state switch means to the juncture between said blocking rectifier and said third capacitor.

References Cited

UNITED STATES PATENTS

| | | | |
|---|---|---|---|
| 3,235,748 | 2/1966 | Mahoney et al. | 307—223 |
| 3,309,537 | 3/1967 | Archer | 307—223 |
| 3,389,270 | 6/1968 | Schoenfeld | 307—223 |

JOHN W. CALDWELL, Primary Examiner

M. SLOBASKY, Assistant Examiner

U.S. Cl. X.R.

307—252; 340—331, 322